(12) United States Patent
Chueh et al.

(10) Patent No.: US 9,305,187 B2
(45) Date of Patent: Apr. 5, 2016

(54) DATA SECURITY MANAGEMENT SYSTEMS AND METHODS

(75) Inventors: Hsin-Ti Chueh, Taoyuan County (TW); Ssu-Po Chin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/402,243

(22) Filed: Feb. 22, 2012

(65) Prior Publication Data

US 2012/0216291 A1   Aug. 23, 2012

Related U.S. Application Data

(60) Provisional application No. 61/445,350, filed on Feb. 22, 2011.

(51) Int. Cl.
| | |
|---|---|
| *G06F 7/04* | (2006.01) |
| *G06F 21/83* | (2013.01) |
| *G06F 21/36* | (2013.01) |
| *G06F 21/74* | (2013.01) |

(52) U.S. Cl.
CPC ............... *G06F 21/83* (2013.01); *G06F 21/36* (2013.01); *G06F 21/74* (2013.01); *G06F 2221/2105* (2013.01)

(58) Field of Classification Search
None
See application file for complete search history.

(56) References Cited

U.S. PATENT DOCUMENTS

| | | | | |
|---|---|---|---|---|
| 6,209,104 B1 * | 3/2001 | Jalili | ............................... | 726/18 |
| 6,335,725 B1 | 1/2002 | Koh et al. | | |
| 6,630,928 B1 | 10/2003 | McIntyre et al. | | |
| 7,836,513 B2 * | 11/2010 | Cradick | ................ | G06F 1/1613 715/864 |
| 8,336,086 B2 * | 12/2012 | Seo | ................................... | 726/5 |
| 2006/0077183 A1 | 4/2006 | Studt | | |
| 2008/0109763 A1 * | 5/2008 | Lee | ................................. | 715/856 |
| 2009/0217389 A1 * | 8/2009 | Estroff et al. | .................... | 726/34 |
| 2009/0254986 A1 * | 10/2009 | Harris | ...................... | G06F 21/74 726/17 |
| 2009/0322687 A1 * | 12/2009 | Duncan et al. | ................. | 345/173 |
| 2010/0091397 A1 * | 4/2010 | Clancy | ...................... | G07F 7/10 359/893 |
| 2010/0182018 A1 * | 7/2010 | Hazelden | ....................... | 324/663 |
| 2010/0225668 A1 * | 9/2010 | Tatke et al. | ..................... | 345/660 |
| 2011/0072510 A1 * | 3/2011 | Cheswick | ............. | G06F 3/0481 726/18 |
| 2011/0090257 A1 * | 4/2011 | Ko et al. | ........................ | 345/660 |
| 2011/0184804 A1 * | 7/2011 | Sontag et al. | .............. | 705/14.49 |
| 2011/0202982 A1 * | 8/2011 | Alexander et al. | ................. | 726/7 |
| 2012/0075204 A1 * | 3/2012 | Murray et al. | ................. | 345/173 |
| 2012/0265981 A1 * | 10/2012 | Moon | .................... | G06F 3/0416 713/150 |
| 2013/0135216 A1 * | 5/2013 | Chiang et al. | .................. | 345/173 |
| 2014/0019652 A1 * | 1/2014 | Soffer | ..................... | G06F 21/83 710/73 |

FOREIGN PATENT DOCUMENTS

| | | |
|---|---|---|
| CN | 1609811 A | 4/2005 |
| WO | WO 2007/062020 A2 | 5/2007 |

\* cited by examiner

*Primary Examiner* — Peter Poltorak
(74) *Attorney, Agent, or Firm* — CKC & Partners Co., Ltd.

(57) ABSTRACT

Data security management system and methods are provided. First, a first system having a management authority is provided. The first system displays an input interface on an input device. A switch switches the management authority from the first system to a second system, wherein the second system operates with a secure mechanism. When the management authority is switched to the second system, the first system transmits layout information of the input interface and an input device characteristic of the input device to the second system. The second system receives input data via the input device, and decodes the input data according to the layout information and the input device characteristic.

17 Claims, 5 Drawing Sheets

|   |   |   |   |
|---|---|---|---|
| 1 | 2 | 3 | 4 |
| 5 | 6 | 7 | 8 |
| 9 | 0 | Del | Enter |

DATA SECURITY MANAGEMENT SYSTEMS AND METHODS

CROSS REFERENCE TO RELATED APPLICATIONS

This Application claims priority of U.S. Provision Application No. 61/445,350, filed on Feb. 22, 2011, the entirety of which is incorporated by reference herein.

BACKGROUND OF THE INVENTION

1. Field of the Invention

The disclosure relates generally to data security management systems and methods, and, more particularly, to systems and methods that switch and transmit related information between different systems during data input, thus to ensure data security.

2. Description of the Related Art

Recently, electronic devices, such as portable devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Generally, users can connect to the Internet, and input confidential data, such as a password or financial data via the electronic device for some specific purposes, for example, online shopping. It is understood that, secure user input is a key factor of a security system. Conventionally, two systems including one trusted and one non-trusted system, can operate in the security system, wherein input procedures are solely processed by the trusted system. Due to the limited processing capability of the trusted system, the trusted system is exclusively designed for a specific input device, such as a touch panel device, and a specific software keypad corresponding to a specific application. In other words, it is inflexible for trusted systems to display various software keypads for different applications or handle different input devices. For example, when a touch panel device is replaced, the trusted system in the electronic device must be changed or re-designed for the new touch panel device since two touch panel devices may have different resolutions. Similarly, when a software keypad corresponding to an application is updated, the trusted system must be accordingly changed or re-designed. Is the limitation, make the security system inflexible and costly.

BRIEF SUMMARY OF THE INVENTION

Data security management systems and methods are provided.

An embodiment of a data security management system includes a first system, a switch, and a second system. The first system has a management authority, and displays an input interface on an input device. The switch switches the management authority from the first system to the second system. The second system operates with a secure mechanism. When the management authority is switched to the second system, the first system transmits layout information of the input interface and an input device characteristic of the input device to the second system. The second system receives input data via the input device, and decodes the input data according to the layout information and the input device characteristic.

In an embodiment of a data security management method, a first system having a management authority is provided. An input interface is displayed on an input device by the first system. Then, the management authority is switched from the first system to a second system by a switch, wherein the second system operates with a secure mechanism. When the management authority is switched to the second system, layout information of the input interface and an input device characteristic of the input device are transmitted to the second system by the first system. Then, input data is received via the input device, and the input data is decoded according to the layout information and the input device characteristic by the second system.

An embodiment of a data security management system includes a first system and a second system. The first system has an input device and displays an input interface. The second system operates with a secure mechanism. The first system transmits layout information of the input interface and an input device characteristic of the input device to the second system. The second system receives input data via the input device, and decodes the input data according to the layout information and the input device characteristic.

In some embodiments, the second system further performs a verification of the decoded input data. In some embodiments, the switch switches the management authority from the second system back to the first system after the verification of the decoded input data.

In some embodiments, the second system further transmits an instruction to the first system, such that the first system responds the input data according to the instruction.

In some embodiments, the first system and the second system are respectively executed by different electronic devices. In some embodiments, the first system and the second system are executed by a processing unit with shared hardware or by respective processing units with respective hardware.

In some embodiments, the first system is a non-trusted operating system or operational environment, and the second system is a trusted operating system or operational environment. In some embodiments, the first system has a networking capability for connecting to a network, and the second system is a closed environment.

Data security management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 2 is a schematic diagram illustrating an embodiment of an example of an input interface of the invention;

DETAILED DESCRIPTION OF THE INVENTION

Data security management systems and methods are provided.

Figure 1:
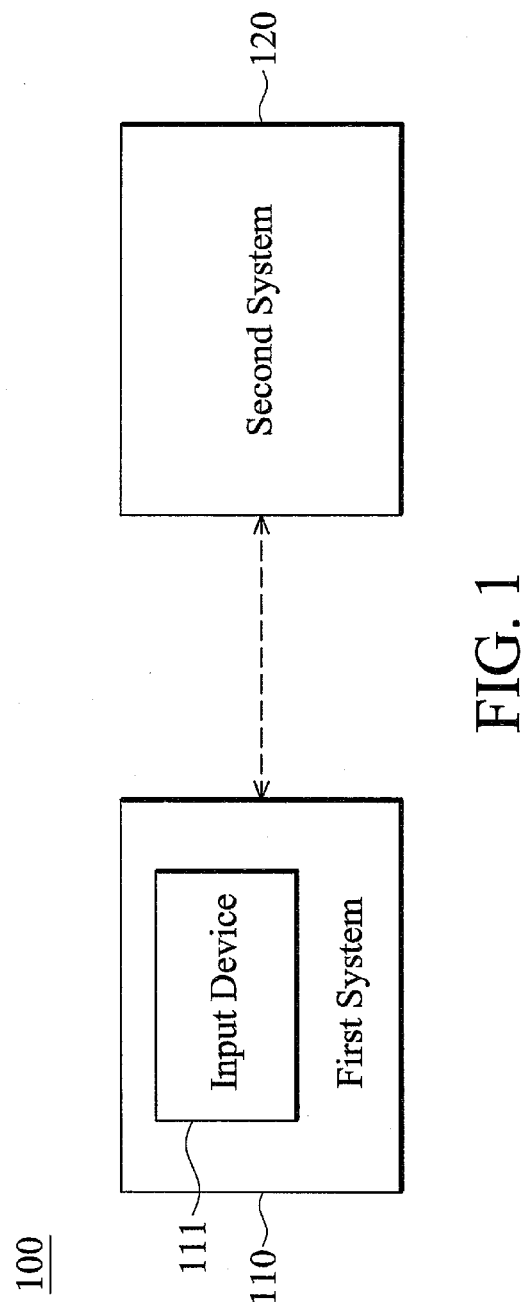
FIG. 1 is a schematic diagram illustrating an embodiment of a data security management system of the invention.

FIG. 1 is a schematic diagram illustrating an embodiment of a data security management system of the invention.

Figure 2:
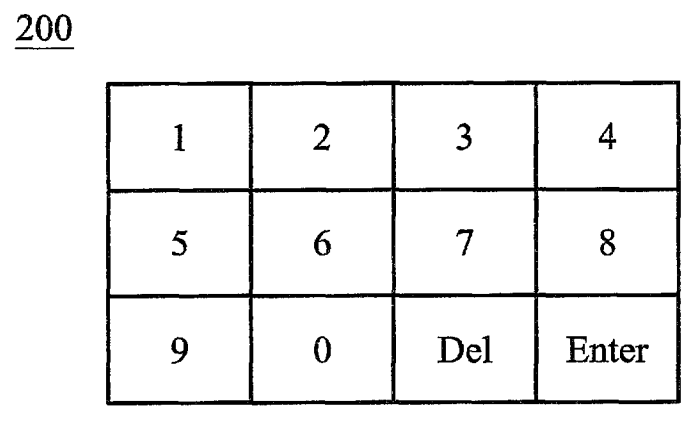

The data security management system 100 comprises a first system 110 and a second system 120. It is understood that, in some embodiments, the first system 110 and the second system 120 can be respectively executed by different electronic devices. In some embodiments, the first system 110 and the second system 120 can be executed by a processing unit with shared hardware or by respective processing units with respective hardware. It is noted that, the processing unit(s) can be in an electronic device or in different electronic devices. It is understood that, in some embodiments, the first system 110 has a stronger processing capability and a larger storage area than that of the second system 120. In some embodiments, the first system 110 may be a non-trusted OS (Operating System) or operational environment. The first system 110 can be installed with various applications, and has a networking capability for connecting to a network, such as an Internet. Since the first system 110 can connect to the Internet, and download data therefrom, it may be affected with viruses, and this is why it is called a non-trusted OS/operational environment. The first system 110 comprises an input device 111. Users can input data via the input device 111. It is understood that, the input device 111 has a corresponding input device characteristic, such as the resolution thereof. Further, the first system 110 can display an input interface having layout information on a screen (not shown). It is understood that, in some embodiments, the input interface may be generated by an application in the first system 110. FIG. 2 is a schematic diagram illustrating an embodiment of an example of an input interface of the invention. As shown in FIG. 2, the input interface 200 has 12 keys including 9 digits from 1 to 0, and a delete key (Del) and an enter key (Enter). The layout information comprises the arrangement and position of the respective keys on the screen. It is understood that, in some embodiments, the input device 111 may be a touch-sensitive device which is integrated with the screen to form a touch-sensitive screen. The touch-sensitive device has a touch-sensitive surface comprising sensors in at least one dimension to detect contact and movement of at least one object (input tool), such as a pen/stylus or finger near or on the touch-sensitive surface. Accordingly, users are able to input data via the touch-sensitive screen.

The second system 120, however, is a trusted OS or operational environment, and is a closed environment, wherein the second system 120 operates with a secure mechanism. Generally, users cannot access and update the trusted OS/operational environment. It is understood that, there may be different types of secure mechanisms according to different types of requirements and applications. In some embodiments, the trusted OS/operational environment can be also called a trust zone. The implementation of the trusted OS/operational environment may be by Trust Logic, G&D (Hill Core), Green Hill (Integrity), and others. Let it be understood that, the implementation of the OS/operational environment of the present invention is not limited thereto.

In the present embodiment, when users want to input confidential data, such as passwords for credit cards or debit cards, the first system 110 will handle all processes prior to the actual inputting of the password. For example, the first system 110 can link to a website, download related information from the website, and render a picture, such as the input interface, as shown in FIG. 2, prompting a user to input the password on the screen. Then, the reception of the password is handled by the second system 120. Related details will be discussed further in the following paragraphs.

Figure 3:
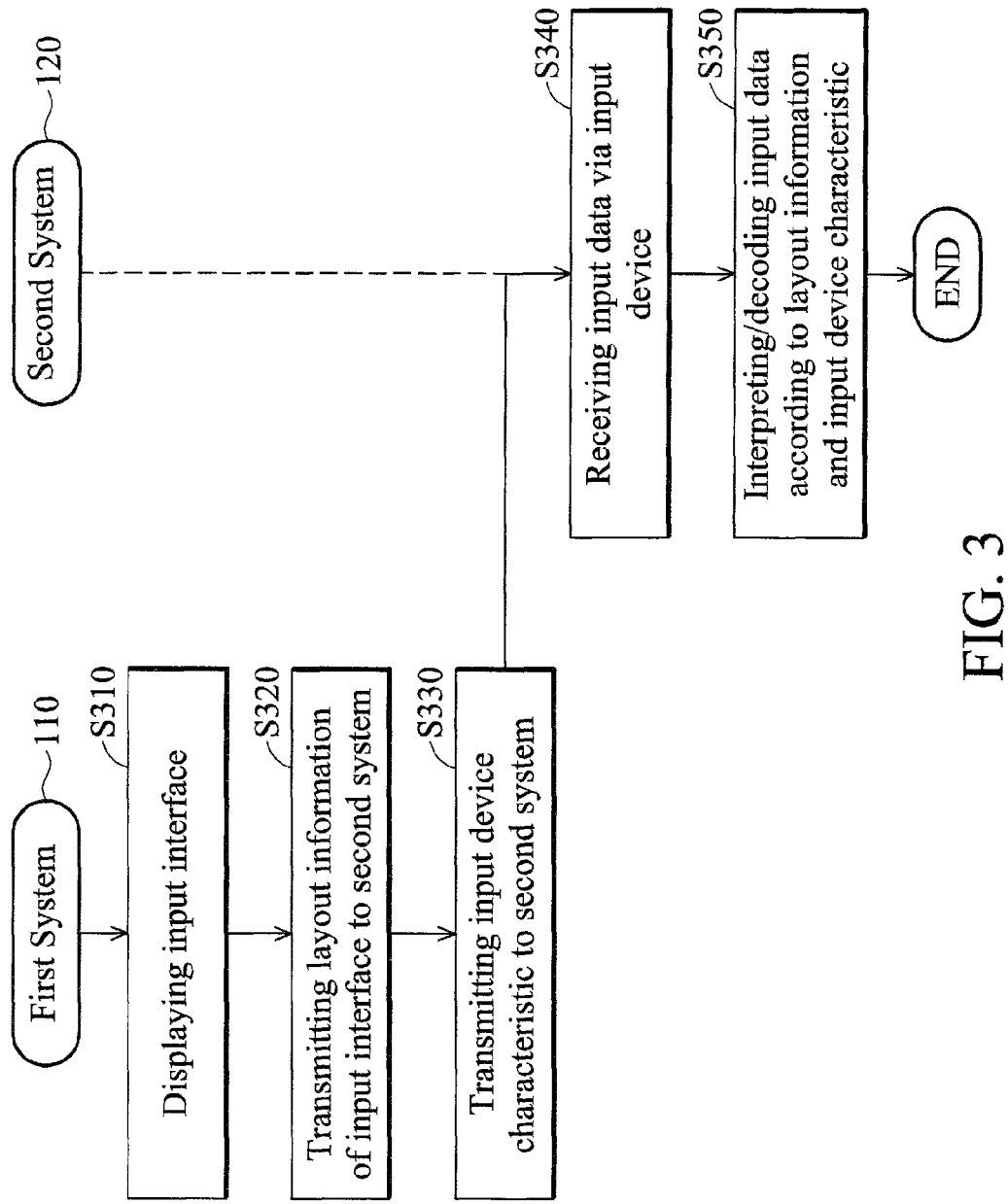
FIG. 3 is a flowchart of an embodiment of a data security management method of the invention.

FIG. 3 is a flowchart of an embodiment of a data security management method of the invention.

In step S310, a first system displays an input interface on a screen, wherein the input interface has layout information (layout data) recording the arrangement and position of respective keys in the input interface. It is understood that, in some embodiments, the input interface may be generated by an application in the first system. It is noted that, the first system may be a non-trusted OS or operational environment. The first system can be installed with various applications, and has a networking capability for connecting to a network, such as an Internet. In step S320, the first system transmits the layout information of the input interface to a second system, and in step S330, transmits at least one input device characteristic, such as the resolution of an input device of the first system to the second system. It is noted that, the second system is a trusted OS/operational environment, and the second system is a closed environment, and the second system operates with a secure mechanism. As described, there may be different types of secure mechanisms according to different types of requirements and applications. It is understood that, in some embodiments, the first system and the second system can be respectively executed by different electronic devices. In some embodiments, the first system and the second system can be executed by a processing unit with shared hardware or by respective processing units with respective hardware. It is noted that, the processing unit(s) can be in an electronic device or in different electronic devices. In some embodiments, the first system has a stronger processing capability and a larger storage area than that of the second system. It is understood that, in some embodiments, the last picture (input interface) rendered by the first system can be displayed on the screen continuously, and users can proceed to input data, such as the password according to the prompt displayed on the screen.

Then, in step S340, the second system receives input data, such as passwords input, and in step S350, and interprets/decodes the input data according to the layout information and the input device characteristic received from the first system. It is understood that, in some embodiments, the second system can transmit an instruction to the first system, wherein the instruction may be determined based on the interpretation/decoding result of the input data. The first system can respond the input data according to the instruction. Further, in some embodiments, the second system can perform subsequent operations, such as verification of passwords (input data).

Figure 4:
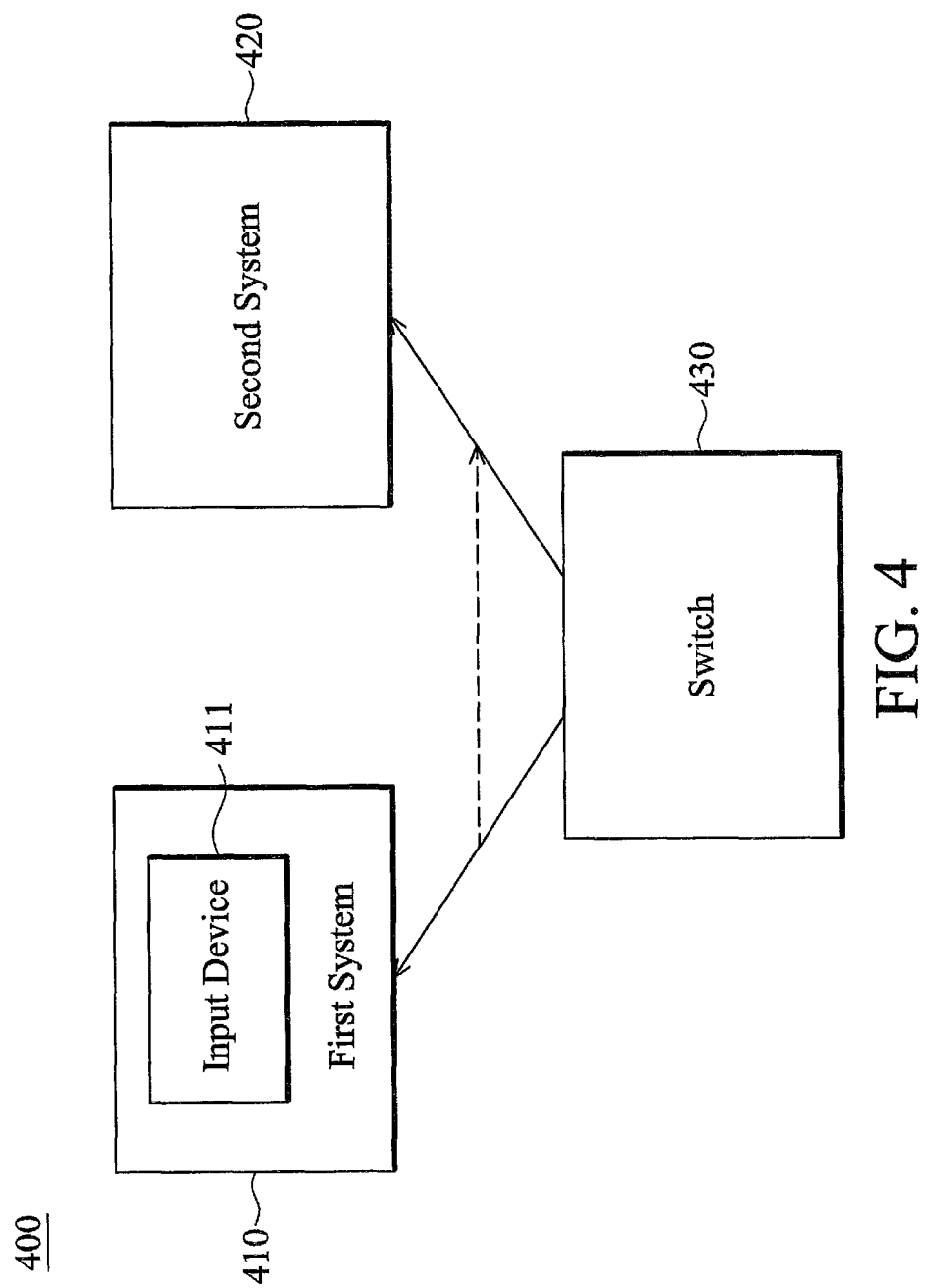
FIG. 4 is a schematic diagram illustrating another embodiment of a data security management system of the invention.

FIG. 4 is a schematic diagram illustrating another embodiment of a data security management system of the invention.

The data security management system 400 comprises a first system 410, a second system 420, and a switch 430. Similarly, in some embodiments, the first system 410 and the second system 420 can be respectively executed by different electronic devices. In some embodiments, the first system 410 and the second system 420 can be executed by a processing unit with shared hardware or by respective processing units with respective hardware. It is noted that, the processing unit(s) can be in an electronic device or in different electronic devices. Similarly, in some embodiments, the first system 410 has a stronger processing capability and a larger storage area than that of the second system 420. In some embodiments, the first system 410 may be a non-trusted OS/operational environment. The first system 410 can be installed with various applications, and has a networking capability for connecting to a network, such as an Internet. The first system 410 comprises an input device 411. Users can input data via the input device 411. It is understood that, the input device 411 has a corresponding input device characteristic, such as the resolution of the input device 411. Further, the first system 410 can display an input interface having layout information on a screen (not shown). Similarly, in some embodiments, the input interface may be generated by an application in the first system 410. The layout information comprises the arrangement and position of the respective keys on the screen. Similarly, in some embodiments, the input device 411 may be a touch-sensitive device which is integrated with the screen to form a touch-sensitive screen. The touch-sensitive device has a touch-sensitive surface comprising sensors in at least one dimension to detect contact and movement of at least one object (input tool), such as a pen/stylus or finger near or on the touch-sensitive surface. Accordingly, users are able to input data via the touch-sensitive screen.

The second system 420 is a trusted OS/operational environment, and the second system 420 is a closed environment, and the second system 120 operates with a secure mechanism. Similarly, there may be different types of secure mechanisms according to different types of requirements and applications. The switch 430 controls a management authority of the data security management system 400. Specifically, the switch 430 automatically switches the management authority between the first system 410 and the second system 420. It is understood that, in some embodiments, the switch may be a physical switch or a logical switch. At one time, one of the systems (the first system 410 and the second system 420) will obtain the management authority, and handle/process related procedures, such as reception of input data via the input device 411.

Similarly, in the present embodiment, when users want to input confidential data, such as passwords for credit cards or debit cards, the first system 410 will handle all processes prior to the actual inputting of the password. Then, the reception of the password is handled by the second system 420. Related details will be discussed further in the following paragraphs.

Figure 5:
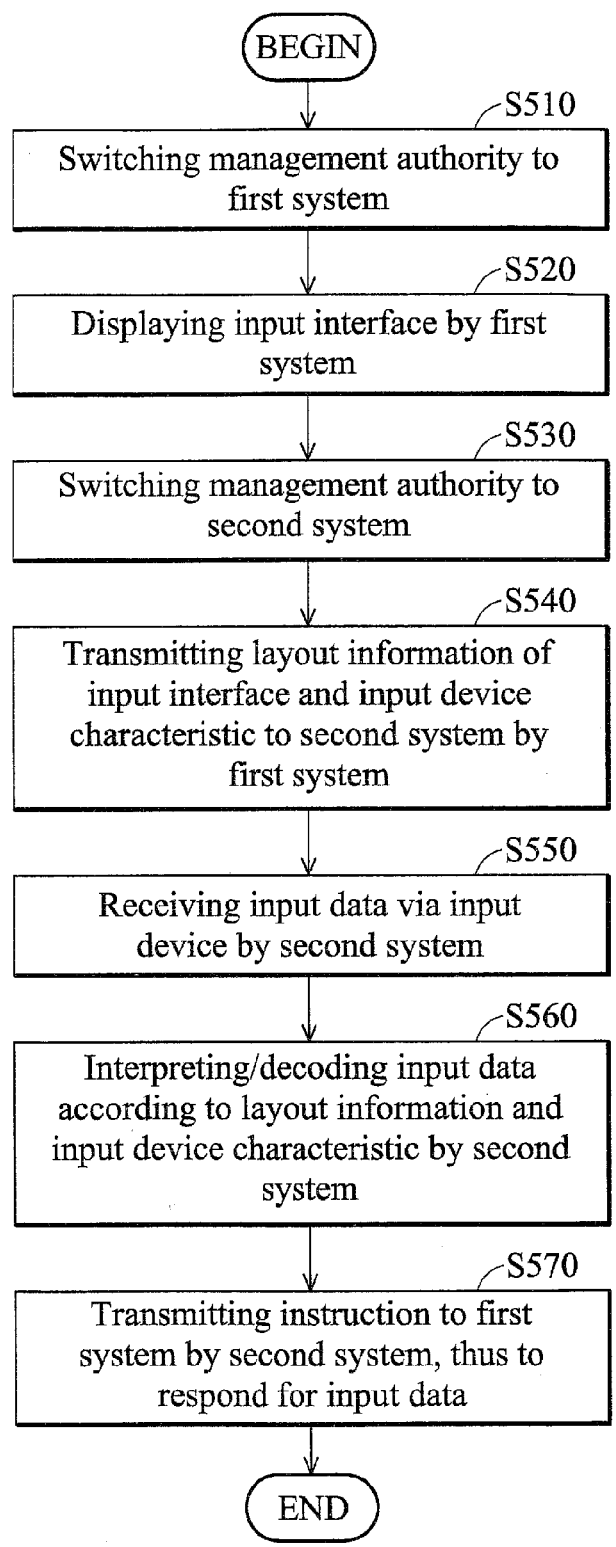
FIG. 5 is a flowchart of another embodiment of a data security management method of the invention.

FIG. 5 is a flowchart of another embodiment of a data security management method of the invention.

In step S510, the management authority is switched to a first system. In step S520, the first system displays an input interface on a screen, wherein the input interface has layout information recording the arrangement and position of the respective key in the input interface. Similarly, in some embodiments, the input interface may be generated by an application in the first system. It is noted that, the first system may be a non-trusted OS or operational environment. The first system can be installed with various applications, and has a networking capability for connecting to a network, such as an Internet. In step S530, the management authority of the input device is switched to a second system. It is noted that, the second system is a trusted OS/operational environment, and the second system is a closed environment, and the second system has a secure mechanism. As described, there may be different types of secure mechanisms according to different types of requirements and applications. It is understood that, in some embodiments, the first system and the second system can be respectively executed by different electronic devices. In some embodiments, the first system and the second system can be executed by a processing unit with shared hardware or by respective processing units with respective hardware. It is noted that, the processing unit(s) can be in an electronic device or in different electronic devices. In some embodiments, the first system has a stronger processing capability and a larger storage area than that of the second system. It is understood that, in some embodiments, the last picture (input interface) rendered by the first system can be displayed on the screen continuously, and users can proceed to input data, such as the password according to the prompt displayed on the screen. In step S540, the first system transmits the layout information of the input interface and at least one input device characteristic, such as the resolution of an input device of the first system to the second system. Then, in step S550, the second system receives input data, such as passwords input via the input device. It is noted that, since the management authority of the input device is switched from the first system to the second system, the first system will no longer receive data from a subsequent user input. User inputs, such as passwords are received by the second system. Then, in step S560, the second system interprets/decodes the input data according to the layout information and the input device characteristic received from the first system. After the input data is interpreted/decoded, in step S570, the second system transmits an instruction to the first system. Similarly, the instruction may be determined based on the interpretation/decoding result of the input data, and the first system can respond the input data according to the instruction. Similarly, in some embodiments, the second system can perform subsequent operations, such as verification of the password (input data). It is understood that, in some embodiments, after the operation for the input data is performed, the switch can automatically switch the management authority of the input device from the second system back to the first system.

Therefore, the data security management systems and methods can switch and transmit related information between different systems during data input, thus to ensure data security, and enhance the flexibility of the security system.

Data security management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A data security management system, comprising;
    a first system having an input device implemented by a touch-sensitive screen, displaying an input interface via a display, outputting layout information of the input interface and an input device characteristic, and inputting input data by the input device; and
    a second system receiving the layout information of the input interface and the input device characteristic of the input device from the first system, receiving input data, and decoding the input data according to the layout information and the input device characteristic, wherein the layout information comprises an arrangement and position of a plurality of respective keys on the screen;

wherein the received device characteristic includes the resolution of the input device;

wherein the first system comprises a non-trusted OS receiving data from a network, which has a networking capability for connecting a network, and the second system is a closed environment, and comprises a trusted OS with a secure mechanism;

wherein the first system and the second system are executed within the same electronic device.

2. The system of claim 1, wherein the first system and the second system are respectively executed by different electronic devices.

3. The system of claim 1, wherein the first system and the second system are executed by a processing unit with shared hardware or by respective processing units with respective hardware.

4. The system of claim 1, further comprising a switch for switching a management authority from the first system to the second system, and when the management authority is switched from the first system to the second system, the first system outputs the layout information of the input interface and the input device characteristic of the input device to the second system, and the second system receives input data via the input device, wherein a system having the management authority is responsible for receiving the input data via the input device.

5. The system of claim 4, wherein the switch is a physical switch or a logical switch.

6. The system of claim 4, wherein the second system further performs a verification of the decoded input data.

7. The system of claim 6, wherein the switch switches the management authority of the input device from the second system back to the first system a her the verification of the decoded input data.

8. The system of claim 1, wherein the second system further transmits an instruction to the first system, such that the first system responds to the input data according to the instruction.

9. A data security management method, comprising:
providing a first system having an input device implemented by a touch-sensitive screen:
displaying an input interface via a display by the first system;
outputting layout information of tile input interface and an input device characteristic of the input device by the first system;
receiving the layout information of file input interface and the input device characteristic of the input device from the first system by a second system;
inputting input data by the input device; and
receiving the input data, and decoding the input data according to the layout information and the input device characteristic by the second system:
wherein the layout information comprises an arrangement and position of a plurality of respective keys on the screen;
wherein the received device characteristic includes the resolution of the input device;
wherein the first system comprises a non-trusted, which has a networking capability for connecting to a network, and the second system is a closed environment, and comprises a trusted operating system with a secure mechanism;
wherein the first system and the second system are executed within the same electronic device.

10. The method of claim 9, wherein the first system and the second system are respectively executed by different electronic devices.

11. The method of claim 9, wherein the first system and the second system are executed by a processing unit with shared hardware or by respective processing units with respective hardware.

12. The method of claim 9, further comprising providing a switch for switching a management authority from the first system to the second system, and when the management authority is switched from the first system to the second system, the first system outputs the layout information of the input interface and the input device characteristic of the input device to the second system, and the second system receives input data via the input device, wherein a system having the management authority is responsible for receiving the input data via the input device.

13. The method of claim 12, wherein the switch is a physical switch or a logical switch.

14. The method of claim 12, further comprising performing a verification of the decoded input data by the second system.

15. The method of claim 14, further comprising switching the management authority of the input device from the second system back to the first system after the decoded input data is verified to be true by the switch.

16. The method of claim 9, further comprising: transmitting an instruction to the first system by the second system; and responding to the input data according to the instruction by the first system.

17. A non-transitory machine-readable storage medium comprising a computer program, which, when executed, causes a device to perform a data security management method, wherein the method comprises:
providing a first system having an input device implemented by a touch-sensitive screen;
displaying an input interface via a display by the first system;
outputting layout information of the input interface and an input device characteristic of the input device by the first system;
receiving the layout information of the input interface and the input device characteristic of the input device from the first system by a second system;
inputting input data by the input device; and
receiving the input data, and decoding the input data according to the layout information and the input device characteristic by tile second system;
wherein the layout information comprises an arrangemenet and position of a plurality of respective keys on the screen;
wherein the received device characteristic includes the resolution of the input device;
wherein the first system comprises a non-trusted, which has a networking capability for connecting to a network, and the second system is a closed environment, and comprises a trusted operating system with a secure mechanism;
wherein the first system and the second system are executed within the same electronic device.

* * * * *